UNITED STATES PATENT OFFICE.

GUSTAV BLIEBERGER, OF NEW YORK, N. Y.

METHOD OF MAKING MENTHYL-SALICYLIC METHYL ESTER.

1,133,832.     Specification of Letters Patent.     Patented Mar. 30, 1915.

No Drawing.     Application filed March 28, 1914. Serial No. 827,817.

*To all whom it may concern:*

Be it known that I, GUSTAV BLIEBERGER, a citizen of the Empire of Austria-Hungary, and a resident of New York, in the county and State of New York, have invented certain new and useful Improvements in Methods of Making Menthyl-Salicylic Methyl Ester, of which the following is a specification.

This invention has reference to improvements in method of making menthyl-salicylic methyl ester. This substance is derived from the salicylic methyl ester and menthol. As is well known, the methyl ester of the salicylic acid is found in nature in a practically pure condition in the well known wintergreen oil, which, however, is very expensive and, therefore, the synthetic ester is generally used on account of its low price.

The present invention is an improvement on Letters Patent of the United States granted to me December 27, 1910 for menthylated oil of wintergreen, Patent Number 979,416. The method described in this patent calls for about equal parts by weight of salicylic methyl ester and menthol because such equal parts represent almost chemically equivalent quantities of the two components regarding their molecular weights. Practice, however, has developed that some of the salicylic methyl ester is mechanically carried over by the carbonic acid gas employed in this process to keep the reaction mass under slight pressure of an inert atmosphere while being heated. The water vapor formed by splitting off one molecule of reaction water during the combination of the two substances may also tend to carry mechanically over some of the salicylic methyl ester. Thus at the end of the process during heating the reaction mass for sixty to ninety hours, according to the quantities employed, some salicylic methyl ester is wanting for obtaining a relatively large percentage of menthyl-salicylic methyl ester which is the final product. In order to compensate for this loss of salicylic-methyl ester in the reaction mass I mix more salicylic-methyl ester with the menthol than required according to the theoretical molecular preparation. I have found in practice that about 20 per cent. of salicylic-methyl ester should be added to the molecular quantities required so that there is no loss of the very expensive menthol. The salicylic-methyl ester found in the forerunner is easily regenerated by fractional distillation while the recovery of uncombined menthol presents more difficulty. However, if such reaction mass is not freed from uncombined menthol before distillation it consequently is found in the reaction mass during distillation and forms a disturbing element therein. For these reasons the addition of some more salicylic-methyl ester than menthol to the reaction mass constitutes an improvement in this art.

The accepted constitutional formula of the salicylic methyl ester is $$OH.C_6H_4CO_2.CH_3.$$

The accepted constitutional formula of menthol is

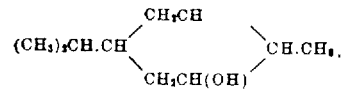

If now one molecule of reaction water is split off by the combination of the hydroxyl group of one component with the hydrogen atom of the hydroxyl group of the other component then a product of addition evidently is formed to which accordingly the following formula may be ascribed:

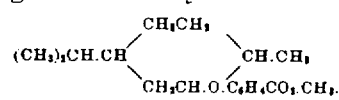

Experiments have shown that about 100 parts of weight of the salicylic-methyl ester give best results with about 80 parts by weight of menthol. Otherwise the process is carried out substantially in the same manner described in my Letters Patent hereinbefore identified and in connection with the apparatus described in my copending application Ser. No. 805,324, filed December 8, 1913.

I claim as my invention:

1. The improvement in the art of producing menthyl-salicylic methyl ester consisting in mixing a relatively large excess of salicylic methyl ester with menthol, combining the same by the application of heat, collecting the forerunner, and distilling the remaining combined reaction mass.

2. The improvement in the art of producing menthyl-salicylic methyl ester consisting in mixing about 100 parts by weight of salicylic methyl ester with about 80 parts of menthol and combining the same by the application of heat, collecting the forerunner and distilling the remaining combined reaction mass.

3. The improvement in the art of producing menthyl-salicylic methyl ester consisting in mixing about 100 parts by weight of salicylic methyl ester with 80 parts of menthol combining the same by the application of heat in an inert atmosphere under slight pressure, collecting the forerunner, and distilling the remaining combined reaction mass in a greatly rarefied atmosphere.

Signed at New York, N. Y., this 26th day of March, 1914.

GUSTAV BLIEBERGER.

Witnesses:
DANIEL P. BERGHEIMER,
E. D. GUILFOYLE.

It is hereby certified that in Letters Patent No. 1,133,832, granted March 30, 1915, upon the application of Gustav Blieberger, of New York, N. Y., for an improvement in "Methods of Making Menthyl-Salicylic Methyl Ester," an error appears in the printed specification requiring correction as follows: Page 1, line 75, the formula

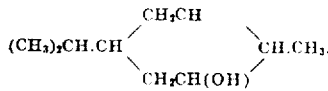

should read

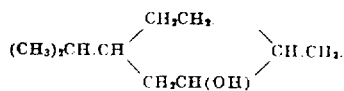

and that the said Letters Patent should be read with this correction therein that the same may conform to the record of the case in the Patent Office.

Signed and sealed this 18th day of May, A. D., 1915.

[SEAL.]

R. F. WHITEHEAD,

*Acting Commissioner of Patents.*